Jan. 30, 1945. J. R. ORELIND ET AL 2,368,156
AGRICULTURAL IMPLEMENT
Filed March 22, 1943 3 Sheets-Sheet 3
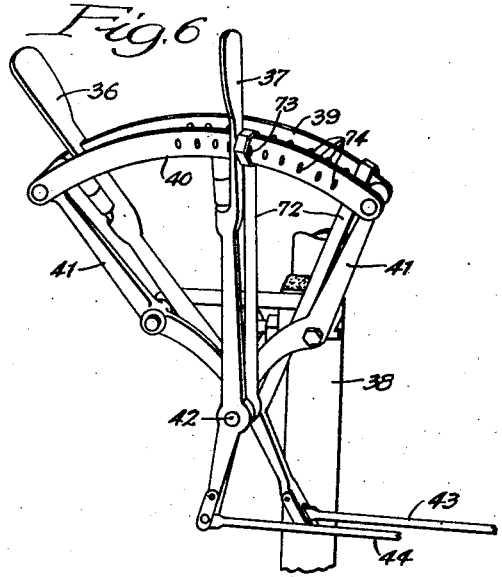
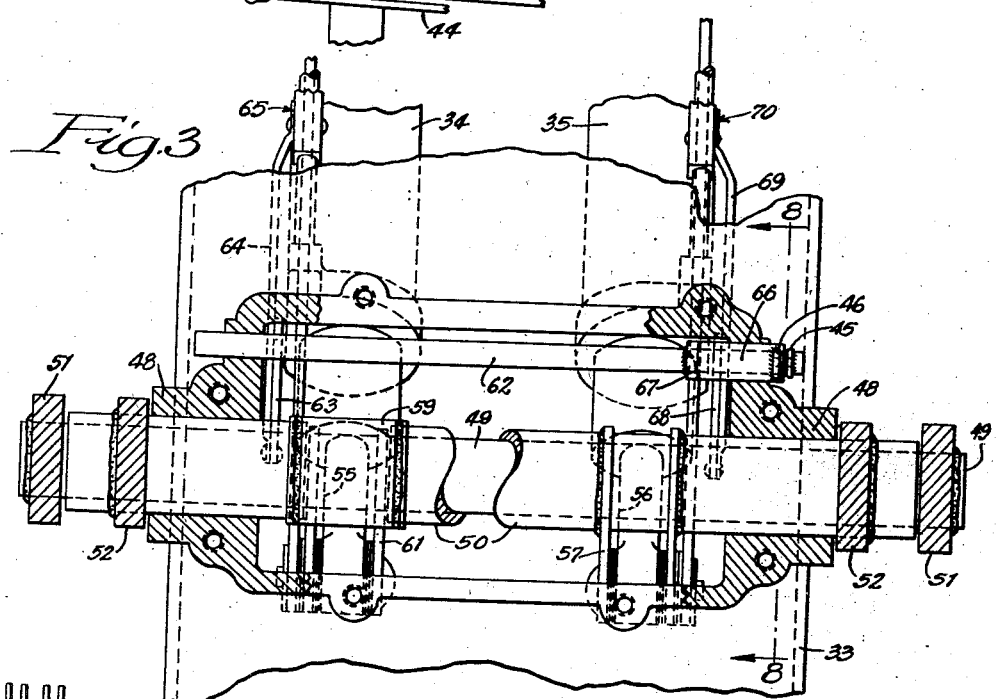
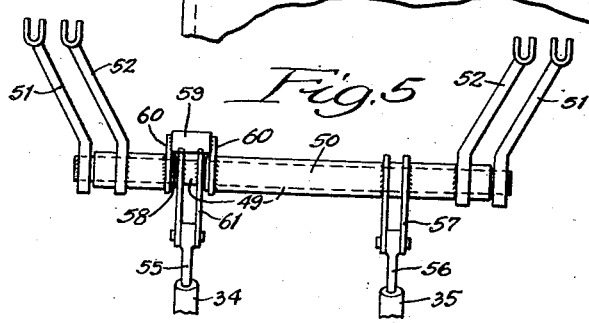
Inventors:
John R. Orelind
and Arthur G. Evans,
By Paul O. Pippel
Attorney.

Patented Jan. 30, 1945

2,368,156

UNITED STATES PATENT OFFICE 2,368,156

AGRICULTURAL IMPLEMENT

John R. Orelind, Wilmette, and Arthur G. Evans, Canton, Ill., assignors to International Harvester Company, a corporation of New Jersey Application March 22, 1943, Serial No. 480,012

11 Claims. (Cl. 97—50)

This invention relates to tractor-mounted agricultural implements and, more particularly, to power lifting mechanism therefor.

The invention is particularly applicable to the type of power-lift control mechanism described in copending United States application of C. W. Mott, Serial No. 466,463, filed November 21, 1942, to which reference may be had for a full disclosure thereof; however, the invention may be readily adapted to other types of power lifts.

In tractor-mounted implements where there are working tools mounted for vertical movement on the front of the tractor and working tools mounted for vertical movement on the rear of the tractor, it is desirable, when cultivating toward the end of a row, that the forwardly mounted tools be raised from the ground when they pass the end of the crop row, but that the rear tools remain in the ground until their part of the cultivating operation is completed. This type of independent operation of front and rear tools is generally known as "delayed lift." At other times, as when encountering raised land at the side of a field, it is desirable that both front and rear working tools on one side of the tractor be raised or lowered independently of the working tools on the other side, either to adjust the working depth thereof or to raise the working tools out of contact with the ground. This type of independent operation of the working tools on one side of a tractor as a unit with respect to those on the other side is known as "selective lift." These types of operation have been previously independently obtainable in a tractor-mounted implement, but no means has been devised for readily converting an implement adapted for delayed lift to an implement adapted for selective lift.

An object of the invention is to provide an improved apparatus for transmitting power to a tractor-mounted implements from a source mounted on the tractor and deriving power therefrom.

Another object is to provide means connected to the source of power, whereby front and rear connected working tools may be raised or lowered independently.

A further object is to provide optional means connected to the source of power, whereby the front and rear working tools on one side of a tractor may be raised independently of the working tools on the other side.

These and other objects and advantages will become clear from the following detailed description when read in conjunction with the accompanying drawings, wherein:

Figure 3 is a plan view of a detail, partly in section, showing the interconnecting means between implements on opposite sides of a tractor and the manner in which the power-lift devices are connected thereto;

Figure 4 is a detail in elevation showing the optional manner by which front and rear working tools may be connected to the power lifting mechanism to obtain lifting of front and rear rigs on one side of the tractor as a unit independently of the tools on the other side;

Figure 5 is an elevation of a portion of the mechanism shown in Figure 3; and

Figure 6 is a detail showing the manual levers for controlling the movement of the working tools.

Figure 1:
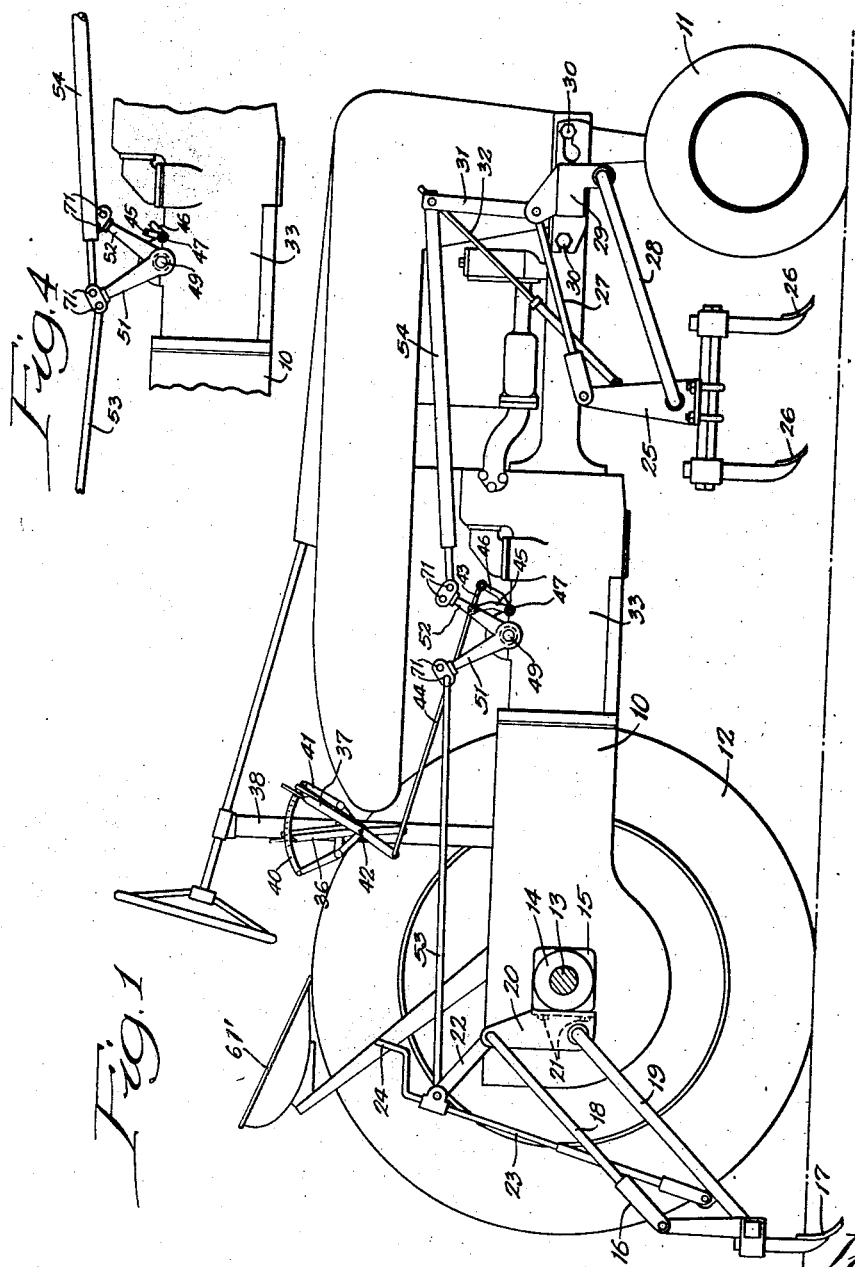
Figure 1 is a view in side elevation of a tractor with an implement embodying the features of the present invention attached thereto, wherein provision is made for independent lifting of front and rear rigs or gangs of working tools.
Figure 2:
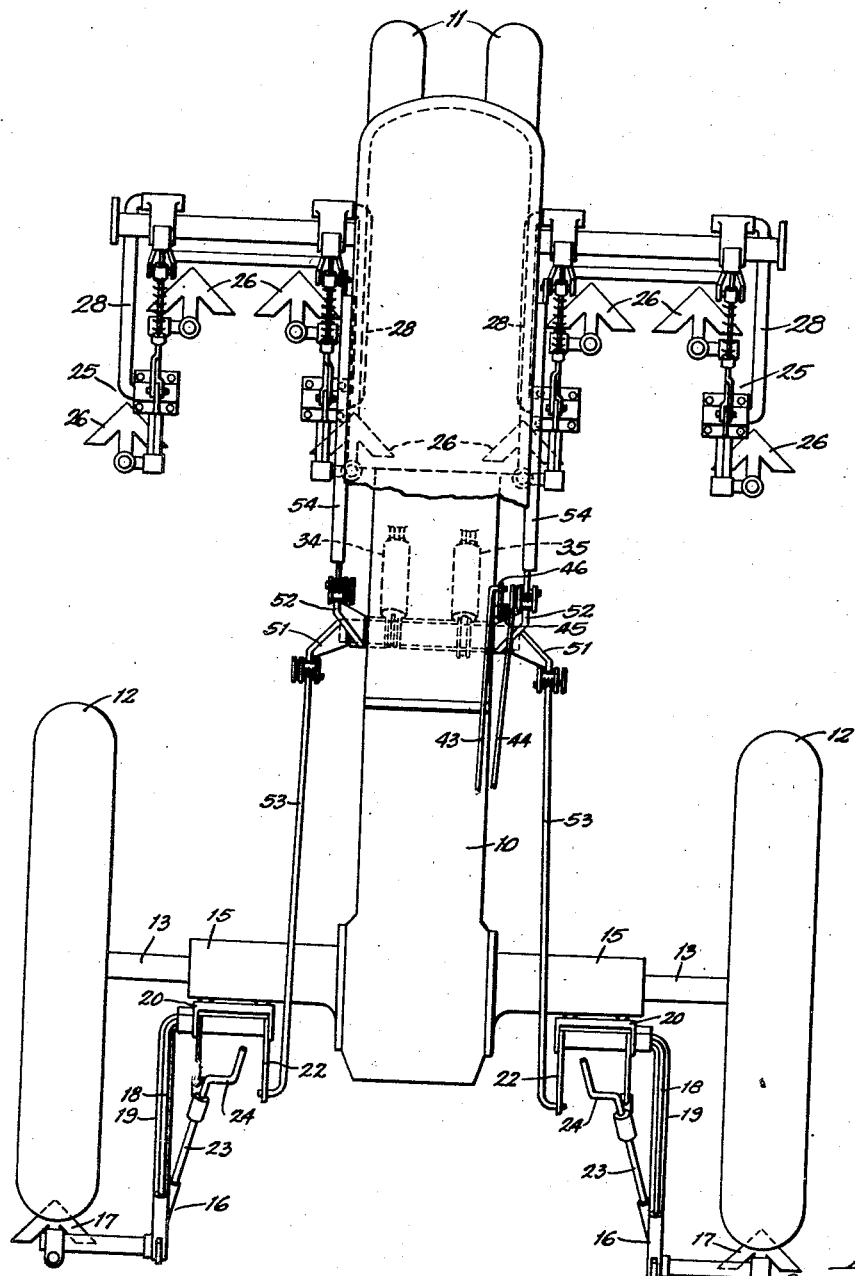
Figure 2 is a plan view of the apparatus illustrated in Figure 1, showing working tools mounted on both sides of a tractor, showing the manner in which working tools on opposite sides of the tractor are interconnected and indicating the position of the power lift devices.

Referring particularly to Figures 1 and 2, it will be noted that the numeral 10 designates the body portion of a tractor having front wheels 11 and rear wheels 12. The rear wheels 12 are mounted on opposite ends of a transverse rear axle 13 journaled in a rear axle structure 14, having affixed thereto attaching portions 15 for the connection of rear cultivator rigs 16. With particular reference to Figure 1, it will be observed that the working tool is provided with a cultivator shovel 17 and is connected to the tractor through the intermediary of upper and lower parallel links 18 and 19, pivotally mounted upon a bracket 20 affixed to the attaching portion 15 by bolts 21. There is likewise provided on bracket 20 a pivoted lever 22 connected to the lower parallel link 19 by an adjustable rod 23 having a handle 24, whereby independent adjustment of the rear rig may be made. To the forward end of the tractor is connected for vertical movement a cultivator rig 25 having cultivating shovels 26 thereon. The connection of the working tool to the tractor is made by means of upper and lower parallel links 27 and 28 pivotally mounted upon a bracket 29 attached to the forward portion of the tractor by means of bolts 30. Also pivoted on the bracket is a lever 31 connected to the working tool by a lift rod 32. As viewed in Figure 2, it may be noted that both sides of the tractor are similarly equipped.

The body portion 10 of the tractor is provided with an intermediate housing 33, in which is enclosed the fluid power arrangement by which the working tools are moved to and from ground-working position. For the purposes of the present invention only fluid-actuated cylinder devices 34 and 35 indicated in Figures 2 and 3 are shown. Actuation of the cylinder devices, and therefore movement of the working tools, is under the control of the tractor operator, and is initiated by manipulation of manual levers 36 and 37 for cylinders 35 and 34, respectively. The levers 36 and 37 are mounted on the steering post 38 of the tractor for movement over dual quadrants 39 and 40, on the supporting framework 41, of which the levers are mounted by a pin 42. Through the intermediary of links 43 and 44 the levers 36 and 37 are connected to levers 45 and 46 pivoted on the housing 33 at 47.

Journaled in bearings 48 in housing 33 and extending to opposite sides of the tractor body is a transverse rock-shaft 49 surrounded by a loose sleeve 50 of such length as to permit the ends of shaft 49 to project somewhat therebeyond. At opposite ends of shaft 49 and outside the housing 33, levers 51 are mounted and affixed to shaft 49 as by welding. These levers are adapted for rocking movement with shaft 49 in directions longitudinally of the tractor. Adjacent opposite ends of sleeve 50 and outside the housing 33, levers 52 are mounted and affixed to the sleeve as by welding. These levers are likewise adapted for rocking movement with sleeve 50 in directions longitudinally of the tractor. In the arrangement shown in Figures 1 and 2, the rear working tools on opposite sides of the tractor are connected by connecting rods 53 to the levers 51 on the shaft 49, while the forward working tools are connected by connecting rods 54 to levers 52 on sleeve 50. Forward movement of lever 51 effects upward movement of rear working tools 16, while forward movement of lever 52 effects upward movement of forward working tools 25. Since shaft 49 and sleeve 50 may be independently rocked, it becomes clear that, with the arrangement shown, the rear working tools 16 may be raised or lowered as a unit independently of the forward working tools 25.

Independent rocking movement of shaft 49 and sleeve 50 is effected by the cylinder devices 34 and 35 located within the housing 33. These cylinder devices are of the double-acting fluid-actuated type and are provided with pistons 55 and 56, as indicated in Figures 3 and 5. Piston 56 is pivotally connected to rock arm 57 affixed to sleeve 50 as by welding. When piston 56 is extended, lever 52 is rocked forwardly, raising the forwardly mounted working tools from the ground. Upon retraction of piston 56, the working tools are returned to ground-working position. In order to procure a connection between cylinder device 34 and shaft 49, the sleeve 50 is provided with an annular opening at 58 and the two portions spanned by a bridge structure 59, clearly shown in Figure 5 and having legs 60 affixed to the sleeve at opposite sides of the opening as by welding. A rock arm 61 is keyed or welded to the shaft 49 and provides a pivotal connection for the end of piston 55. Upon extension of piston 55, shaft 49 is rocked within the limits permitted by the bridge 59. Lever 51 moves forward and the rear working tool 16 is raised. Upon retraction of piston 55, the tool is lowered.

As stated before, fluid is supplied to the cylinder devices 34 and 35 for actuating shaft 49 and sleeve 50 by a mechanism which forms no part of the present invention. This mechanism provides a high degree of control of the rate at which fluid is supplied to the cylinders 34 and 35, and manual operation of this mechanism is effected by the levers 36 and 37, accessible to and under the control of an operator from his station 61'. Lever 37, through link 44, is connected to lever 45. Lever 45 is affixed to the end of a shaft 62 extending through and rotatably mounted in housing 33. Depending from shaft 62 is an arm 63 operatively connected by a link 64 to a control mechanism generally indicated at 65 for cylinder device 34. This control mechanism may be more fully understood by reference to co-pending United States application Serial No. 466,463. Adjacent its right-hand end, shaft 62 is surrounded by a short sleeve 66, held against lateral displacement by a collar 67 keyed to the shaft 62, and having affixed thereto the lever 46. Likewise, affixed to sleeve 66 is an arm 68 operatively connected by a link 69 to a control mechanism generally indicated at 70 for cylinder device 35, the operation of which is substantially similar to that provided for control mechanism 65.

When it is desired to effect delayed lifting of rear working tools with respect to front working tools, as at the end of a row, the manual lever 36 is first moved along the portion 39 of the quadrant to the position corresponding to the vertical position the front working tools are to occupy with respect to the ground. Cylinder 35 is then actuated and piston 56 extended to rock lever 52 forwardly to raise the front working tools from ground-working position. When the rear working tools have reached the end of the row, the manual lever 37 is manipulated to turn shaft 62 and actuate cylinder 34. Piston 55 is then extended to rock lever 51 forwardly, thus raising the rear working tools.

Referring now to Figure 4, it may be noted that levers 51 and 52 are each provided at their ends with two openings 71 for the connection thereto of rods 53 and 54. Rods 53 and 54 are readily disconnectable from the openings 71 and, when it is desired to convert the implement to the selective lift type, the rod 54 on the right side of the tractor may be disconnected from lever 52 and connected to lever 51, as indicated in Figure 4. At the same time, rod 53 on the left side of the tractor is connected to the lever 52 on that side. Thus, on the right side of the tractor, front and rear working tools are connected to lever 51 which is mounted on shaft 49, and, on the left side of the tractor, front and rear working tools are connected to lever 52 which is mounted on sleeve 50. Operation of manual lever 36 then controls the raising and lowering of implements on the left side of the tractor, and manual lever 37 controls operation of the tools on the right side of the tractor as a unit. The location of both levers 36 and 37 on one side of the tractor adjacent the steering post facilitates the manipulation of the working tools as separate units. Likewise, the operator can raise or lower all of the working tools simultaneously by grasping both of the levers with one hand and manipulating them jointly. To facilitate adjustment of the working tools over limited ranges, as in depth adjustment, stop members 72 may be utilized. Stops 72 are pivoted on the pin 42, and each is provided with a detent 73 adapted to engage openings 74 in the quadrant, and may be adjusted to any desired position thereon.

In an age when diversified farming is being widely practiced, the adaptability of implements to varied conditions of soil and topography is of prime importance. From the foregoing description it will be observed that a simple and effective mechanism has been devised for readily converting a tractor-mounted implement from a delayed-lift implement to a selective-lift implement, or vice versa, to quickly meet the varied conditions that may be encountered in a cultivating or other soil-working operation. At the end of a cultivated field, the operator has under full control the independent operation of his front and rear working tools as units to permit delayed lifting of his rear tools. Also, when the working tools on one side of the tractor are traveling on raised ground, it is desirable that these tools be raised to prevent them from digging too deeply into the soil, and for such purpose provision is made in the present invention to quickly convert the implement to one employing either delayed lift or selective lift. While the invention has been described in connection with the utilization of cultivating tools, it is obvious, of course, that it is adaptable for use with other soil-working tools.

Having now described the invention in its preferred form, it should be understood that variations may be made therein without departing from the spirit of the invention or the scope of the appended claims.

What is claimed is:

1. In a tractor-mounted agricultural implement comprising front and rear earth-working rigs mounted upon opposite sides of the tractor for vertical movement with respect thereto and power-lifting devices mounted upon the tractor and deriving power therefrom, in combination, means for effecting delayed lifting of rear rigs with respect to front rigs by disconnectably connecting front and rear rigs as separate units to independent sources of power, and means for converting said delayed lift to selective lift by connecting front and rear rigs on opposite sides of the tractor as units to independent sources of power, whereby lifting of front and rear rigs on one side of the tractor may be made with respect to front and rear rigs on the other side of said tractor.

2. In a tractor-mounted agricultural implement comprising front and rear earth-working rigs mounted upon opposite sides of the tractor for vertical movement with respect thereto and power-lifting devices mounted upon the tractor and deriving power therefrom, in combination, means for connecting front rigs on opposite sides of the tractor to a common source of power, means for connecting rear rigs on opposite sides of the tractor to a common source of power, whereby a delayed lifting arrangement of rear rigs with respect to front rigs may be effected, means for connecting front and rear rigs on one side of said tractor to a common source of power, and means for connecting front and rear rigs on the other side of said tractor to a common source of power, whereby the said delayed lifting arrangement may be converted into a selective lifting arrangement and front and rear rigs on one side of the tractor may be independently lifted as a unit.

3. In a tractor-mounted agricultural implement comprising front and rear earth-working rigs mounted upon opposite sides of the tractor for vertical movement with respect thereto and power-lifting devices mounted on the tractor, in combination, a transverse shaft extending to opposite sides of the tractor, arms affixed to opposite ends of said shaft, means connecting said arms to one set of said rigs, a sleeve loose upon said shaft, arms affixed to opposite ends of said sleeve, means connecting said arms to another set of said rigs, and power means for independently rocking said shaft and said sleeve.

4. In a tractor-mounted implement comprising front and rear gangs of earth-working tools on each side of the tractor adapted for movement to and from working position, in combination, a transverse rock-shaft mounted on and extending to opposite sides of the tractor, a rock arm at each end of the shaft, lifting connections between said arms and one gang of working tools on each side of the tractor, a sleeve on the rock-shaft, a rock arm at each end of the sleeve, lifting connections between said arms and another gang of working tools on each side of the tractor, and means for interchangeably connecting the lifting connections on each side of the tractor to a single rock arm.

5. In a tractor-mounted implement comprising front and rear gangs of earth-working tools on each side of the tractor adapted for movement to and from working position, in combination, a transverse rock-shaft mounted on and extending to opposite sides of the tractor, a rock arm at each end of the shaft, lifting connections between said arms and the rear working tools, a sleeve on the rock-shaft, a rock arm at each end of the sleeve, lifting connections between said arms and the front working tools, said lifting connections being readily disconnectable, and means for connecting both of the lifting connections on one side of the tractor to the shaft rock arm, and on the other side of the tractor to the sleeve rock arm.

6. In a tractor-mounted implement comprising front and rear earth-working rigs mounted upon opposite sides of the tractor for vertical movement with respect thereto, wherein means are provided for raising and lowering certain of said rigs with respect to others, in combination, interchangeable connecting means for optionally effecting independent lifting of front rigs with respect to rear rigs as units, or independent lifting of front and rear rigs on one side of the tractor with respect to front and rear rigs on the other side of the tractor, as units, said means comprising transversely extending, concentric, rockable members mounted on the tractor, an arm connected to each end of each said member, disconnectable means connecting front rigs on each side of the tractor to the arms on one of said members, disconnectable means connnecting rear rigs on each side of the tractor to the arms on the other of said members, whereby independent movement of front rigs with respect to rear rigs may be effected, means for connecting the connecting means for front and rear rigs on one side of the tractor only to the arm on one said member, means for connecting the connecting means for front and rear rigs on the other side of said tractor only to the arm on the other said member, whereby independent movement may be made of front and rear rigs on one side of the tractor with respect to front and rear rigs on the other side of said tractor, and means for independently rocking said members.

7. In a tractor-mounted agricultural implement comprising front and rear earth-working rigs mounted upon opposite sides of the tractor for vertical movement with respect thereto, wherein means are provided for raising and lowering one set of rigs with respect to another, in combination, interchangeable connecting means for optionally effecting delayed lifting of front rigs with respect to rear rigs as units, or selective lifting of front and rear rigs on one side of the tractor with respect to front and rear rigs on the other side of the tractor, as units, said means comprising a transverse shaft on the tractor, an arm connected to each end of said shaft, a sleeve on said shaft, an arm connected to each end of said sleeve, disconnectable means connecting front rigs on each side of the tractor to one of said arms, disconnectable means connecting rear rigs on each side of the tractor to the other of said arms, whereby independent movement of front rigs with respect to rear rigs may be effected, means for connecting the connecting means for front and rear rigs on one side of the tractor only to the arm on said shaft, means for connecting the connecting means for front and rear rigs on the other side of said tractor only to the arm on said sleeve, whereby independent movement may be made of front and rear rigs on one side of the tractor with respect to front and rear rigs on the other side of said tractor, and power means for independently rocking said shaft and said sleeve.

8. In a tractor-mounted agricultural implement comprising front and rear earth-working rigs mounted upon opposite sides of the tractor for vertical movement with respect thereto and laterally spaced power-lifting devices mounted on opposite sides of the longitudinal center line of the tractor, in combination, a transverse shaft extending beyond the lateral limits of said power devices, arms affixed to opposite ends of said shaft, a sleeve loose upon said shaft and substantially coextensive therewith, arms affixed to opposite ends of said sleeve, means connecting said earth-working rigs to said arms, means connecting one said power lift to said sleeve intermediate its ends for rocking movement thereof, means connecting said other power lift to said shaft intermediate its ends for rocking movement thereof, and means permitting independent rocking movement of said shaft with respect to said sleeve, said last-mentioned means including an arcuate opening in said sleeve for the connection of said power lift to said shaft.

9. In a tractor-mounted agricultural implement comprising front and rear earth-working rigs mounted upon opposite sides of the tractor for vertical movement with respect thereto and laterally spaced power-lifting devices mounted on the tractor, in combination, a transverse shaft extending beyond the lateral limits of said power devices, arms affixed to opposite ends of said shaft, a sleeve loose upon said shaft and substantially coextensive therewith, arms affixed to opposite ends of said sleeve, means connecting said earth-working rigs to said arms, means connecting one said power lift to said sleeve intermediate its ends for rocking movement thereof, means connecting said other power lift to said shaft intermediate its ends for rocking movement thereof, and means permitting independent rocking movement of said shaft with respect to said sleeve, said last-mentioned means including an annular opening in said sleeve for the connection of said power lift to said shaft, and a bridge rigidly affixed to said sleeve and spanning said opening.

10. In a power transmission device including a rock-shaft and an independently rockable sleeve on said shaft, means connecting said sleeve to a source of power for rocking movement thereof, and means connecting said shaft to a source of power at a point intermediate the ends of said sleeve, said last-mentioned means including a rock arm affixed to said shaft and connected to said source of power, and an arcuate opening in said sleeve of sufficient extent to permit relative movement of said rock arm with respect to said sleeve.

11. In a power transmission device including a rock-shaft and an independently rockable sleeve on said shaft, means connecting said sleeve to a source of power for rocking movement thereof, and means connecting said shaft to a source of power at a point intermediate the ends of said sleeve, said last-mentioned means including a rock arm affixed to said shaft and connected to said source of power, an annular opening in said sleeve, and a bridge spanning said opening and rigidly affixed to said sleeve on each side of said opening.

JOHN R. ORELIND.
ARTHUR G. EVANS.